United States Patent
Patton et al.

(10) Patent No.: US 11,682,209 B2
(45) Date of Patent: Jun. 20, 2023

(54) PREDICTION OF NBA TALENT AND QUALITY FROM NON-PROFESSIONAL TRACKING DATA

(71) Applicant: STATS LLC, Chicago, IL (US)

(72) Inventors: Andrew Patton, Chicago, IL (US); Nathan Walker, Durham, NC (US); Matthew Scott, Chicago, IL (US); Alex Ottenwess, Chicago, IL (US)

(73) Assignee: STATS LLC, Chicago, IL (US)

( * ) Notice: Subject to any disclaimer, the term of this patent is extended or adjusted under 35 U.S.C. 154(b) by 67 days.

(21) Appl. No.: 17/449,694

(22) Filed: Oct. 1, 2021

(65) Prior Publication Data
US 2022/0108111 A1    Apr. 7, 2022

Related U.S. Application Data

(60) Provisional application No. 63/086,372, filed on Oct. 1, 2020.

(51) Int. Cl.
*G06N 5/04*     (2023.01)
*G06T 7/292*    (2017.01)
*G06V 20/40*    (2022.01)

(52) U.S. Cl.
CPC ............. *G06V 20/42* (2022.01); *G06N 5/042* (2013.01); *G06T 7/292* (2017.01); *G06V 20/44* (2022.01)

(58) Field of Classification Search
None
See application file for complete search history.

(56) References Cited

U.S. PATENT DOCUMENTS

| | | | |
|---|---|---|---|
| 6,616,529 | B1 | 9/2003 | Qian et al. |
| 6,710,713 | B1 | 3/2004 | Russo |
| 9,342,785 | B2 | 5/2016 | Lucey et al. |
| 9,442,933 | B2 | 9/2016 | Tzoukermann |
| 10,201,752 | B2 | 2/2019 | Lucey et al. |
| 10,460,176 | B2 | 10/2019 | Chang et al. |
| 11,157,742 | B2 | 10/2021 | Zhang et al. |

(Continued)

FOREIGN PATENT DOCUMENTS

| | | |
|---|---|---|
| CN | 1386241 | 12/2002 |
| CN | 105833502 | 8/2016 |

(Continued)

OTHER PUBLICATIONS

Pourmehr, et al., "An overview on opponent modeling in RoboCup soccer simulation 2D," Springer, 2011, pp. 402-414.

(Continued)

*Primary Examiner* — Idowu O Osifade
(74) *Attorney, Agent, or Firm* — DLA Piper LLP (US)

(57) ABSTRACT

A computing system identifies broadcast video for a plurality of games in a first league. The broadcast video includes a plurality of video frames. The computing system generates tracking data for each game from the broadcast video of a corresponding game. The computing system enriches the tracking data. The enriching includes merging play-by-play data for the game with the tracking data of the corresponding game. The computing system generates padded tracking data based on the tracking data. The computing system projects player performance in a second league for each player based on the tracking data and the padded tracking data.

20 Claims, 7 Drawing Sheets

(56) References Cited

U.S. PATENT DOCUMENTS

| | | |
|---|---|---|
| 11,182,806 B1 | 11/2021 | Arfa et al. |
| 11,232,109 B1 | 1/2022 | Knoll et al. |
| 2002/0165697 A1 | 11/2002 | Min |
| 2004/0148278 A1 | 7/2004 | Milo et al. |
| 2005/0143198 A1 | 6/2005 | Charge |
| 2006/0083304 A1 | 4/2006 | Pan et al. |
| 2006/0149674 A1 | 7/2006 | Cook et al. |
| 2006/0252476 A1 | 11/2006 | Bahou |
| 2007/0293289 A1 | 12/2007 | Loeb |
| 2008/0281444 A1 | 11/2008 | Krieger et al. |
| 2009/0186679 A1 | 7/2009 | Irvine et al. |
| 2009/0203447 A2 | 8/2009 | Hansen et al. |
| 2010/0129780 A1 | 5/2010 | Homsi et al. |
| 2010/0184495 A1 | 7/2010 | Levy et al. |
| 2010/0184563 A1 | 7/2010 | Molyneux et al. |
| 2010/0283630 A1 | 11/2010 | Alonso |
| 2010/0298958 A1 | 11/2010 | Connelly |
| 2011/0013087 A1 | 1/2011 | House et al. |
| 2011/0169959 A1 | 7/2011 | DeAngelis et al. |
| 2011/0173235 A1 | 7/2011 | Aman et al. |
| 2011/0267461 A1 | 11/2011 | Birenboim et al. |
| 2012/0162435 A1 | 6/2012 | Elangovan et al. |
| 2012/0214602 A1 | 8/2012 | Ahlstrom |
| 2013/0104870 A1 | 5/2013 | Rizzo et al. |
| 2013/0110271 A1 | 5/2013 | Fornell et al. |
| 2013/0225271 A1 | 8/2013 | Amaitis |
| 2013/0238106 A1 | 9/2013 | Ellis et al. |
| 2013/0267328 A1 | 10/2013 | Heisler et al. |
| 2014/0142921 A1 | 5/2014 | Gleadall et al. |
| 2014/0143183 A1 | 5/2014 | Sigal et al. |
| 2014/0206479 A1 | 7/2014 | Marty et al. |
| 2014/0236331 A1 | 8/2014 | Lehmann et al. |
| 2014/0274245 A1 | 9/2014 | Stickel |
| 2014/0302914 A1 | 10/2014 | Weinstein et al. |
| 2014/0309000 A1 | 10/2014 | Gustafson |
| 2014/0364976 A1 | 12/2014 | Wohl et al. |
| 2015/0058730 A1 | 2/2015 | Dubin et al. |
| 2015/0131845 A1 | 5/2015 | Forouhar et al. |
| 2015/0142716 A1 | 5/2015 | Lucey et al. |
| 2015/0148129 A1 | 5/2015 | Austerlade et al. |
| 2015/0258416 A1 | 9/2015 | Ianni et al. |
| 2015/0360134 A1 | 12/2015 | Rodriguez |
| 2016/0007054 A1 | 1/2016 | Polumbus et al. |
| 2016/0096071 A1 | 4/2016 | Ianni et al. |
| 2016/0182415 A1 | 6/2016 | Ames et al. |
| 2016/0203279 A1 | 7/2016 | Srinivas et al. |
| 2016/0220878 A1 | 8/2016 | Devathi |
| 2016/0260015 A1 | 9/2016 | Lucey et al. |
| 2016/0375365 A1 | 12/2016 | Thompson et al. |
| 2017/0043260 A1 | 2/2017 | Austerlade et al. |
| 2017/0061314 A1 | 3/2017 | Schnurr et al. |
| 2017/0072321 A1 | 3/2017 | Thompson et al. |
| 2017/0080336 A1 | 3/2017 | Groset et al. |
| 2017/0109015 A1 | 4/2017 | Krasadakis |
| 2017/0132821 A1 | 5/2017 | Valliani et al. |
| 2017/0165570 A1 | 6/2017 | Lucey et al. |
| 2017/0166557 A1 | 6/2017 | Lucey et al. |
| 2017/0235848 A1 | 8/2017 | Van Dusen et al. |
| 2017/0238055 A1 | 8/2017 | Chang et al. |
| 2017/0246539 A1 | 8/2017 | Schwartz et al. |
| 2017/0255830 A1 | 9/2017 | Chen |
| 2017/0257653 A1 | 9/2017 | Farre et al. |
| 2017/0291093 A1 | 10/2017 | Janssen |
| 2017/0330029 A1 | 11/2017 | Turcot et al. |
| 2018/0032858 A1 | 2/2018 | Lucey et al. |
| 2018/0056124 A1 | 3/2018 | Marty et al. |
| 2018/0084310 A1 | 3/2018 | Katz et al. |
| 2018/0099201 A1 | 4/2018 | Marty et al. |
| 2018/0137364 A1 | 5/2018 | Forouhar et al. |
| 2018/0157974 A1 | 6/2018 | Carr et al. |
| 2018/0158196 A1* | 6/2018 | Marks ............... G06T 13/20 |
| 2018/0204111 A1 | 7/2018 | Zadeh et al. |
| 2018/0213033 A1 | 7/2018 | Subbian |
| 2018/0218243 A1 | 8/2018 | Felsen et al. |
| 2019/0087661 A1 | 3/2019 | Lee et al. |
| 2019/0205652 A1 | 7/2019 | Ray et al. |
| 2019/0221072 A1* | 7/2019 | Litman ............... A63F 3/0665 |
| 2019/0224556 A1 | 7/2019 | Ruiz et al. |
| 2019/0228290 A1 | 7/2019 | Ruiz et al. |
| 2019/0228306 A1 | 7/2019 | Power et al. |
| 2019/0251366 A1 | 8/2019 | Zhong et al. |
| 2019/0374839 A1 | 12/2019 | Wanke et al. |
| 2020/0004752 A1 | 1/2020 | Majumdar et al. |
| 2020/0043287 A1 | 2/2020 | Zhang et al. |
| 2020/0074181 A1 | 3/2020 | Chang et al. |
| 2020/0170549 A1 | 6/2020 | Baykaner et al. |
| 2020/0218902 A1 | 7/2020 | Chang et al. |
| 2020/0230501 A1 | 7/2020 | Schwartz et al. |
| 2020/0302181 A1 | 9/2020 | Bhanu et al. |
| 2020/0336802 A1 | 10/2020 | Russell et al. |
| 2020/0349611 A1 | 11/2020 | Publicover et al. |
| 2020/0353311 A1 | 11/2020 | Ganguly et al. |
| 2021/0056458 A1 | 2/2021 | Savova et al. |
| 2021/0134124 A1 | 5/2021 | Srinivasan |
| 2021/0142066 A1 | 5/2021 | Jayaram et al. |
| 2021/0256265 A1 | 8/2021 | Gurpinar-Morgan et al. |
| 2021/0272599 A1 | 9/2021 | Patterson et al. |
| 2021/0304736 A1 | 9/2021 | Kothari et al. |
| 2021/0383123 A1 | 12/2021 | Hobbs et al. |
| 2021/0397846 A1 | 12/2021 | Chang et al. |
| 2022/0055689 A1 | 2/2022 | Mandlekar et al. |
| 2022/0067983 A1 | 3/2022 | Fidler et al. |
| 2022/0253679 A1 | 8/2022 | Power et al. |
| 2022/0270004 A1 | 8/2022 | Ruiz et al. |
| 2022/0284311 A1 | 9/2022 | Haynes et al. |

FOREIGN PATENT DOCUMENTS

| | | |
|---|---|---|
| KR | 10-0986647 | 10/2010 |
| WO | 2014/008134 | 1/2014 |
| WO | 2015/076682 | 5/2015 |
| WO | 2017/031356 | 2/2017 |
| WO | 2017/161167 | 9/2017 |
| WO | 2020/010040 | 1/2020 |

OTHER PUBLICATIONS

Hubácek, et al., "Lifted Relational Team Embeddings for Predictive Sports Analytics," ILP Up-and-Coming/Short Papers, 2018, 7 pages.

Sha, et al., "Fine-Grained Retrieval of Sports Plays using Tree-Based Alignment of Trajectories", arXiv preprint arXiv:1710.02255, Oct. 6, 2017, 10 pages.

Lee, et al., "Desire: Distant Future Prediction in Dynamic Scenes with Interacting Agents", Proceedings of the IEEE Conference on Computer Vision and Pattern Recognition, 2017, 10 pages.

Alahi, et al., "Social LSTM: Human Trajectory Prediction in Crowded Spaces", Proceedings of the IEEE conference on computer vision and pattern recognition, 2016, 11 pages.

Jain, et al., "Recurrent Neural Networks for Driver Activity Anticipation via Sensory-Fusion Architecture", IEEE International Conference on Robotics and Automation (ICRA), 2016, 8 pages.

Akhter, et al., "Bilinear Spatiotemporal Basis Models", ACM Transactions on Graphics, vol. 30, No. 2, Article 17, Apr. 2012, 12 pages.

Lucey, et al., "Representing and Discovering Adversarial Team Behaviors using Player Roles", Proceedings of the IEEE Conference on Computer Vision and Pattern Recognition, 2013, 8 pages.

Insafutdinov, et al., "ArtTrack: Articulated Multi-Person Tracking in the Wild", Proceedings of the IEEE Conference on Computer Vision and Pattern Recognition, 2017, 9 pages.

Le, et al., "Coordinated Multi-Agent Imitation Learning", Proceedings of the 34th International Conference on Machine Learning—vol. 70. JMLR. org, 2017, 13 pages.

Yamaguchi, et al., "Who are you with and Where are you going?", CVPR 2011. IEEE, 2011, 8 pages.

Butt, et al., "Multi-target Tracking by Lagrangian Relaxation to Min-Cost Network Flow", Proceedings of the IEEE Conference on Computer Vision and Pattern Recognition, 2013, 8 pages.

Wang, et al., "Learning Optimal Parameters For Multi-target Tracking", International journal of computer vision 122.3 , 2017, 13 pages.

(56) References Cited

OTHER PUBLICATIONS

Maksai, et al., "What Players do with the Ball: A Physically Constrained Interaction Modeling", Proceedings of the IEEE Conference on Computer Vision and Pattern Recognition, 2016, 10 pages.
Kim, et al., "Motion Fields to Predict Play Evolution in Dynamic Sport Scenes", IEEE Computer Society Conference on Computer Vision and Pattern Recognition, 2010, 8 pages.
Chen, et al., "Learning Online Smooth Predictors for Realtime Camera Planning using Recurrent Decision Trees", Proceedings of the IEEE Conference on Computer Vision and Pattern Recognition, 2016, 14 pages.
Zheng, et al., "Generating Long-term Trajectories Using Deep Hierarchical Networks", Advances in Neural Information Processing Systems, 2016, 9 pages.
Felsen, et al., "What will Happen Next? Forecasting Player Moves in Sports Videos", Proceedings of the IEEE International Conference on Computer Vision, 2017, 10 pages.
Su, et al., "Social Behavior Prediction from First Person Videos", arXiv preprint arXiv:1611.09464, Nov. 29, 2016, 10 pages.
Koren, et al., "Matrix Factorization Techniques For Recommender Systems", Computer, IEEE Computer Society, Aug. 2009, 8 pages.
Deng, et al., "Factorized Variational Autoencoders for Modeling Audience Reactions to Movies", Proceedings of the IEEE Conference on Computer Vision and Pattern Recognition, 2017, 10 pages.
Charles, et al., "Personalizing Human Video Pose Estimation", Proceedings of the IEEE conference on computer vision and pattern recognition, 2016, 14 pages.
Kingman, et al., "Auto-Encoding Variational Bayes", arXiv preprint arXiv:1312.6114, May 1, 2014, 14 pages.
Gregor, et al., "DRAW: A Recurrent Neural Network For Image Generation", arXiv preprint arXiv:1502.04623, May 20, 2015, 10 pages.
Bowman, et al., "Generating Sentences from a Continuous Space", arXiv preprint arXiv:1511.06349, May 12, 2016, 12 pages.
Kingma, et al., "Semi-supervised Learning with Deep Generative Models", Advances in neural information processing systems, Oct. 31, 2014, 9 pages.
Sohn, et al., "Learning Structured Output Representation using Deep Conditional Generative Models", Advances in neural information processing systems, 2015, 9 pages.
Van den Oord, et al., "Pixel Recurrent Neural Networks", arXiv preprint arXiv:1601.06759, Aug. 19, 2016, 11 pages.
Pathak, et al., "Contect Encoders: Feature Learning by Inpainting", Proceedings of the IEEE conference on computer vision and pattern recognition, 2016, 12 pages.
Walker, et al., "An Uncertain Future: Forecasting from Static Images using Variational Autoencoders", European Conference on Computer Vision, 2016, 17 pages.
PCT International Application No. PCT/US22/77383, International Search Report and Written Opinion of the International Searching Authority, dated Dec. 13, 2022, 15 pages.
PCT International Application No. PCT/US22/76934, International Search Report and Written Opinion of the International Searching Authority, dated Dec. 13, 2022, 10 pages.
Blaikie, et al., "NFL & NCAA Football Prediction using Artificial Neural network," Proceedings of the Midstates Conference for Undergraduate Research in Computer Science and Mathematics, 2011, 8 pages.
Zhao, Yu, et al., "Applying deep bidirectional LSTM and mixture density network for basketball trajectory prediction," Optik, 2018, pp. 266-272.
ESPN Staff, "Neymar from Barca to PSG for €222m: Timeline of the world's biggest transfer", ESPN, http://www.espn.com/soccer/blog/soccer-transfers/613/post/3170513/neymar-from-barcelona-to-psg-for-222m-euros-timeline-as-worlds-biggest-transfer-nears, Aug. 4, 2017, 18 pages.
Pulling, "Long Corner Kicks In The English Premier League: Deliveries Into The Goal Ara And Critical Area", Kinesiology: International journal of fundamental and applied kinesiology 47.2, 2015, pp. 193-201.
Casal, et al., "Analysis of Corner Kick Success in Elite Football", International Journal of Performance Analysis in Sport 2015, pp. 430-451.
Bialkowski, et al., "Large-Scale Analysis of Soccer Matches using Spatiotemporal Tracking Data", IEEE International Conference on Data Mining, 2014, 6 pages.
Lucey, et al., "Quality vs Quantity: Improved Shot Prediction in Soccer using Strategic Features from Spatiotemporal Data", 9th Annual MIT Sloan Sports Analytics Conference, Feb. 27-28, 2015, 9 pages.
Le, et al., "Data-Driven Ghosting using Deep Imitation Learning", MIT Sloan Sports Analytics Conference, Mar. 3-4, 2017, 15 pages.
Cervone, et al., "Pointwise: Predicting Points and Valuing Decisions in Real Time with NBA Optical Tracking Data", 8th Annual MIT Sloan Sports Analytics Conference, Feb. 28-Mar. 1, 2014, 9 pages.
Ross, et al., "Shortcomings in the attribution process: On the origins and maintenance of erroneous social assessments", Cambridge University Press, 1982, pp. 129-152.
Wright, "Liverpool's set-piece problem exposed in 3-3 draw with Watford", https://www.skysports.com/football/news/15117/10985307/liverpools-set-piece-problem-exposed-in-3-3-draw-with-watford, Dec. 8, 2017, 9 pages.
Walters, "Virgil van Dijk transfer may not fix Liverpool's dismal defending of set-pieces warns Jurgen Klopp after Watford woe", https://www.mirror.co.uk/sport/football/news/liverpool-klopp-van-dijk-setpiece-10981217, Aug. 13, 2017, 21 pages.
Frey, et al., "Clustering by Passing Messages Between Data Points" Science Magazine, Feb. 15, 2007, 23 pages.
Anderson, et al., "The Numbers Game: Why Everything You Know About Soccer is Wrong", 2013, Penguin Books.
Maher, "Modelling Association Football Scores", Statistics Neerlandica 36, nr.3, Published 1982, pp. 109-118.
Dixon, et al., "Modelling Association Football Scores and Inefficiencies in the Football Betting Market", Appl Statist 46. No. 2, Published 1997, pp. 265-280.
Koopman, et al., "A dynamic bivariate Poisson model for analysing and forecasting match results in the English Premier League", Dated Sep. 24, 2012, 30 pages.
Boshnakov, et al., "A Bivariate Weibull Count Model For Forecasting Association Football Scores", Dated Sep. 9, 2016, 13 pages.
Boice, "How Our Club Soccer Projections Work", FiveThirtyEight, https://fivethirtyeight.com/features/how-our-club-soccer-projections-work/, Dated Jan. 19, 2017, 6 pages.
Goddard, et al., "Modelling football match results and the efficiency of fixed-odds betting", Published 2004, 27 pages.
Huang, et al., "A Neural Network Method for Prediction of 2006 World Cup Football game", Published 2010 IEEE, 8 pages.
Kharrat, et al., "Plus-Minus Player Ratings for Soccer", arXiv:1706.04943v1, Dated Jun. 16, 2017, 17 pages.
Dubow, "San Antonio Spurs' Kawhi Leonard ruled out for Game 2 vs. Golden State Warriors", http://www.nba.com/article/2017/05/15/san-antonio-spurs-kawhi-leonard-out-game-2, Dated May 15, 2017, 4 pages.
Beuoy, "Updated NBA Win Probability Calculator", InPredictable, http://www.inpredictable.com/2015/02/updated-nba-win-probability-calculator.html, Dated Feb. 6, 2015, 4 pages.
Asif, et al., "In-Play forecasting of win probability in One-Day International cricket: A dynamic logistic regression model", International Journal of Forecasting 32, Published 2016, pp. 34-43.
Pelechrinis, "iWinRNFL: A Simple, Interpretable & Well-Calibrated In-Game Win Probability Model for NFL", arXiv:1704.00197v3, Dated Mar. 14, 2018, 7 pages.
Lock, et al., "Using random forests to estimate win probability before each play of an NFL game", JQAS 2014; 10(2); Published 2014, pp. 197-205.
Schechtman-Rock, "Introducing NFLWin: An Open Source Implementation of NFL Win Probability", PhD Football, http://phdfootball.blogspot.com/2016/09/introducing-nflwin-open-source.html, Dated Sep. 1, 2016, 4 pages.

(56) References Cited

OTHER PUBLICATIONS

Bishop, "Mixture Density Networks", Neural Computing Research Group Report, NCRG/94/004, Dated Feb. 1994, 26 pages.
Kingma, et al., "Adam: A Method for Stochastic Optimization", arXiv:1412.6980v9, ICLR 2015, Dated Jan. 30, 2017, 15 pages.
Paine, "The Pats' Comeback Was Incredible—Even If You Think The Falcons Blew It", FiveThirtyEight, https://fivethirtyeight.com/features/patriots-falcons-comeback-super-bowl/, Dated Feb. 6, 2017, 4 pages.
Deerwester, et al., "Indexing by Latent semantic Analysis", Published 1990, 34 pages.
Blei, et al., "Latent Dirichlet Allocation", Journal of Machine Learning Research 3, Published 2003, pp. 993-1022.
Bengio, et al., "A Neural Probabilistic Language Model", Journal of Machine Learning Research 3, Published 2003, pp. 1137-1155.
Mikolov, et al., "Efficient Estimation of Word Representations in Vector Space", arXiv:1301.3781v3, Dated Sep. 7, 2013, 12 pages.
Mikolov, et al., "Distributed Representations of Words and Phrases and their Compositionality", Published 2013, 9 pages.
Ho, "Random Decision Forests", Published 1995 IEEE, pp. 278-282.
Van den Cord, et al., "WaveNet: A Generative Model For Raw Audio", arXiv:1609.03499v2, Dated Sep. 19, 2016, 15 pages.
Chung, et al., "Hierarchical Multiscale Recurrent Neural Networks", ICLR 2017, arXiv:1609.01704v7, Dated Mar. 9, 2017, 13 pages.
Graves, "Generating Sequences with Recurrent Neural Networks", arXiv:1308.0850v5, Dated Jun. 5, 2014, 43 pages.
Srinivas, et al., "A taxonomy of deep convolutional neural nets for computer vision," Frontiers in Robotics and AI 2, Jan. 11, 2016, 13 pages.
Dertat, et al., "Applied deep learning—part 4: Convolutional neural networks," Towards Data Science 26, https://towardsdatascience.com/applied-deep-learning-part-4-convolutional-neural-networks-584bc134c1e2, Nov. 8, 2017, 26 pages.
Edge AI and Vision Alliance, "Using Cconvolutional Neural Networks fo Image Recognition," https://www.edge-ai-vision.com/2015/11/using-convolutional-neural-networks-for-image-recognition/, Nov. 12, 2015, 20 pages.
Machine Learning Notebook, "Convolutional Neural Networks—Basics," https://mlnotebook.github.io/post/CNN1/, Apr. 7, 2017, 13 pages.
Knauf, et al., "Spatio-temporal convolution kernels," Machine learning 102.2, Jul. 2015, 28 pages.
Chandler, et al., "An exploratory study of minor league baseball statistics," Journal of Quantitative Analysis in Sports 8.4, 2012, 37 pages.
Perricone, et al., "Predicting Results for Professional Basketball Using NBA API Data," 2016, 6 pages.
Kinoshita, et al., "Deep mixture density network for statistical model-based feature enhancement," 2017 IEEE International Conference on Acoustics, Speech and Signal Processing (ICASSP), Mar. 2017, pp. 251-255.
Wang, et al., "Classifying NBA offensive plays using neural networks," Proceedings of MIT Sloan Sports Analytics Conference, vol. 4, 2016, 9 pages.
Zhao, "Research and Application of Online Learning of Formation Strategy Based on Neural Network Information Technology Collection of China Masters' Dissertations Full Text Database," No. 2, 2014, pp. 38-40.
Liang, et al., "Dual motion GAN for future-flow embedded video prediction," proceedings of the IEEE international conference on computer vision, 2017, 9 pages.
Mehrotra, "Elements of artifical neural networks," MIT Press, 1997.
Arabzad, et al., "Football match results prediction using artificial neural networks; the case of Iran Pro League," Journal of Applied Research on Industrial Engineering 1.3, Oct. 9, 2014, pp. 159-179.
PCT International Application No. PCT/US19/14614, International Search Report and Written Opinion of the International Searching Authority, dated Apr. 16, 2019, 9 pages.

PCT International Application No. PCT/US19/14608, International Search Report and Written Opinion of the International Searching Authority, dated Apr. 15, 2019, 12 pages.
PCT International Application No. PCT/US21/16583, International Search Report and Written Opinion of the International Searching Authority, dated Apr. 23, 2021, 11 pages.
Acuna, "Unsupervised modeling of the movement of basketball players using a deep generative model," 31st Conference on Neural Information Processing Systems, 2017, 11 pages.
Felsen, et al., "Where will they go? predicting fine-grained adversarial multi-agent motion using conditional variational autoencoders," Proceedings of the European conference on computer vision (ECCV), 2018, pp. 761-776.
Nakashima, et al., "Off-line learning of soccer formations from game logs," 2010 World Automation Congress, 2010, 6 pages.
Janetzko, et al., "Feature-driven visual analytics of soccer data," 2014 IEEE conference on visual analytics science and technology (VAST), Nov. 2014, pp. 13-22.
Wagenaar, "Predicting Goal-Scoring Opportunities in Soccer by Using Deep Convolutional Neural Networks," Department of Artificial Intelligence, University of Groningen, Nov. 16, 2016, 65 pages.
Abreu, et al., "Improving a simulated soccer team's performance through a Memory-Based Collaborative Filtering approach," Applied Soft Computing 23, 2014, pp. 180-193.
McCabe, et al., "Artificial intelligence in sports prediction," Fifth International Conference on Information Technology New Generations, IEEE Computer Society, Apr. 9, 2008, 4 pages.
Abdullah, et al., "Intelligent prediction of soccer technical skill on youth soccer player's relative performance using multivariate analysis and artificial neural network techniques," International Journal on Advanced Science, Engineering and Information Technology 6.5, Dec. 2016, pp. 668-674.
Preferred Networks, Inc., "Football Analytics using Deep Learning," YouTube, https://www.youtube.com/watch?v=hs_v3dv6OUI, Jul. 25, 2019, 3 pages.
Power, et al., "Not all passes are created equal: Objectively measuring the risk and reward of passes in soccer from tracking data," Proceedings of the 23rd ACM SIGKDD international conference on knowledge discovery and data mining, Aug. 2017, pp. 1605-1613.
Cervone, et al., "A multiresolution stochastic process model for predicting basketball possession outcomes," Journal of the American Statistical Association 111.514, 2016, pp. 585-599.
Ruiz, et al., "The Leicester City Fairytale?" Utilizing New Soccer Analytics Tools to Compare Performance in the 15/16 & 16/17 EPL Seasons, Proceedings of the 23rd ACM SIGKDD International Conference on Knowledge Discovery and Data Mining, 2017, 13 pages.
Gyarmati, et al., "Searching for a unique style in soccer," arXiv preprint arXiv:1409.0308, 2014, 4 pages.
PCT International Application No. PCT/US21/53117, International Search Report and Written Opinion of the International Searching Authority, dated Jan. 14, 2022, 9 pages.
Wei, "Modelling and Predicting Adversarial Behavious using Large Amounts of Spatiotemporal Data," Queensland University of Technology, 2016, 164 pages.
Carney, et al., "Predicting probability distributions for surf height using an ensemble of mixture density networks," Proceedings of the 22nd international conference on Machine learning, 2005, 8 pages.
Ji, et al., "NBA All-Star lineup prediction based on neural networks," 2013 International Conference on Information Science and Cloud Computing Companion, 2013, pp. 864-869.
Pettersson, et al., "Football match prediction using deep learning," Department of Electrical Engineering, Chalmers University of Technology, 2017, 72 pages.
Merhej, et al., "What Happened Next? Using Deep Learning to Value Defensive Actions in Football Event-Data," KDD, Aug. 2021, pp. 3394-3403.
PCT International Application No. PCT/US22/15240, International Search Report and Written Opinion of the International Searching Authority, dated May 11, 2022, 7 pages.

(56) References Cited

OTHER PUBLICATIONS

Trainor, "Goalkeepers: How repeatable are shot saving performances?", STATSBOMB, https://statsbomb.com/2014/10/goalkeepers-how-repeatable-are-shot-saving-performances/, Oct. 21, 2014.
Newton, "How Youtub Perfected The Feed", The Verge, https://www.theverge.com/2017/8/30/16222850/youtube-google-brain-algorithm-video-recommendation-personalized-feed, Aug. 30, 2017.
Covington, et al., "Deep neural networks for youtube recommendations", Proceedings of the 10th ACM conference on recommender systems, pp. 191-198, Sep. 2016.
Cheng, et al., "Wide & deep learning for recommender systems", Proceedings of the 1st workshop on deep learning for recommender systems, Sep. 2016.
Alcorn, "(batter|pitcher) 2vec: statistic-free talent modeling with neural player embeddings", MIT Sloan Sports Analytics Conference, 2018.
Wei, et al., "The thin edge of the wedge: Accurately predicting shot outcomes in tennis using style and context priors", Proceedings of the 10th Annual MIT Sloan Sport Anal Conference, Mar. 2016.
Seidl, et al., "Bhostgusters: Realtime interactive play sketching with synthesized NBA defenses", Proceeding of the 12th MIT Sloan Sports Analytics Conference, 2018.
Maaten, et al., "Visualizing data using t-SNE", Journal of machine learning research Sep. 2008, pp. 2579-2605, Nov. 2008.
Felsen, et al., "Body shots: Analyzing shooting styles in the NBA using body pose", MIT Sloan, Sports Analytics Conference, Mar. 2017.
Dinsdale, et al., "Interactive Gaming in Sports," U.S. Appl. No. 17/934,756, filed Sep. 23, 2022, 39 pages.
PCT International Application No. PCT/US22/17229, International Search Report and Written Opinion of the International Searching Authority, dated Jun. 9, 2022, 9 pages.
PCT International Application No. PCT/US22/18709, International Search Report and Written Opinion of the International Searching Authority, dated Jun. 24, 2022, 11 pages.
Huang, et al., "Graph Analysis of Major League Soccer Networks: CS224W Final Project," http://snap.stanford.edu/class/cs224w-2018/reports/CS224W-2018-46.pdf, Dec. 9, 2018, 9 pages.

Tian, et al., "Use of machine learning to automate the identification of basketball strategies using whole team player tracking data," Applied Sciences 10.1, Dec. 18, 2019, 17 pages.
PCT International Application No. PCT/US21/34568, International Search Report and Written Opinion of the International Searching Authority, dated Aug. 25, 2021, 9 pages.
Wagenaar, et al. "Using deep convolutional neural networks to predict goal-scoring opportunities in soccer," International Conference on Pattern Recognition Applications and Methods, vol. 2, SCITEPRESS, 2017, 8 pages.
Stein, et al. "Bring it to the pitch: Combining video and movement data to enhance team sport analysis," IEEE transactions on visualization and computer graphics 24.1,2017,, pp. 13-22.
Al-Shboul, et al., "Automated Player Selection for Sports Team using Competitive Neural Networks", International Journal of Advanced Computer Science and Applications (IJACSA), vol. 8, No. 8, 2017, pp. 457-460.
International Search Report and Written Opinion for PCT Application No. PCT/US2019/014609, dated Apr. 12, 2019, 10 pages.
International Search Report and Written Opinion for PCT Application No. PCT/US2019/014613, dated Apr. 12, 2019, 9 pages.
Yue, et al., "Learning Fine-Grained Spatial Models for Dynamic Sports Play Prediction", ICDM, 2014, 10 pages.
International Search Report and Written Opinion for PCT Application No. PCT/US2016/066733, dated Apr. 17, 2017, 11 pages.
Sha, et al., "Chalkboarding: A New Spatiotemporal Query Paradigm for Sports Play Retrieval", IUI, 2016, 12 pages.
Cox, et al., "Least Squares Congealing for Unsupervised Alignment of Images", CVPR, 2008, 8 pages.
Hinton, et al. "A Fast Learning Algorithm for Deep Belief Nets", Neural Comput, 18(7), 2006, pp. 1527-1554.
Learned-Miller, "Data Driven Images Models through Continuous Joint Alignment", IEEE Transactions on Pattern Analysis and Machine Intelligence, vol. 28, No. 2, Feb. 2006, pp. 236-250.
Lucey, et al., "Representing and Discovering Adversarial Team Behaviors using Player Roles," CVPR, 2013, 8 pages.
Miller, et al., "Factorized Point Process Intensities: A Spatial Analysis of Professional Basketball", ICML, Jan. 8, 2014, 13 pages.
Peng, et al., "RASL: Robust Alignment by Sparse and Low-rank Decomposition for Linearly Correlated Images", PAMI, vol. 34, No. 11, 2012, 8 pages.

* cited by examiner

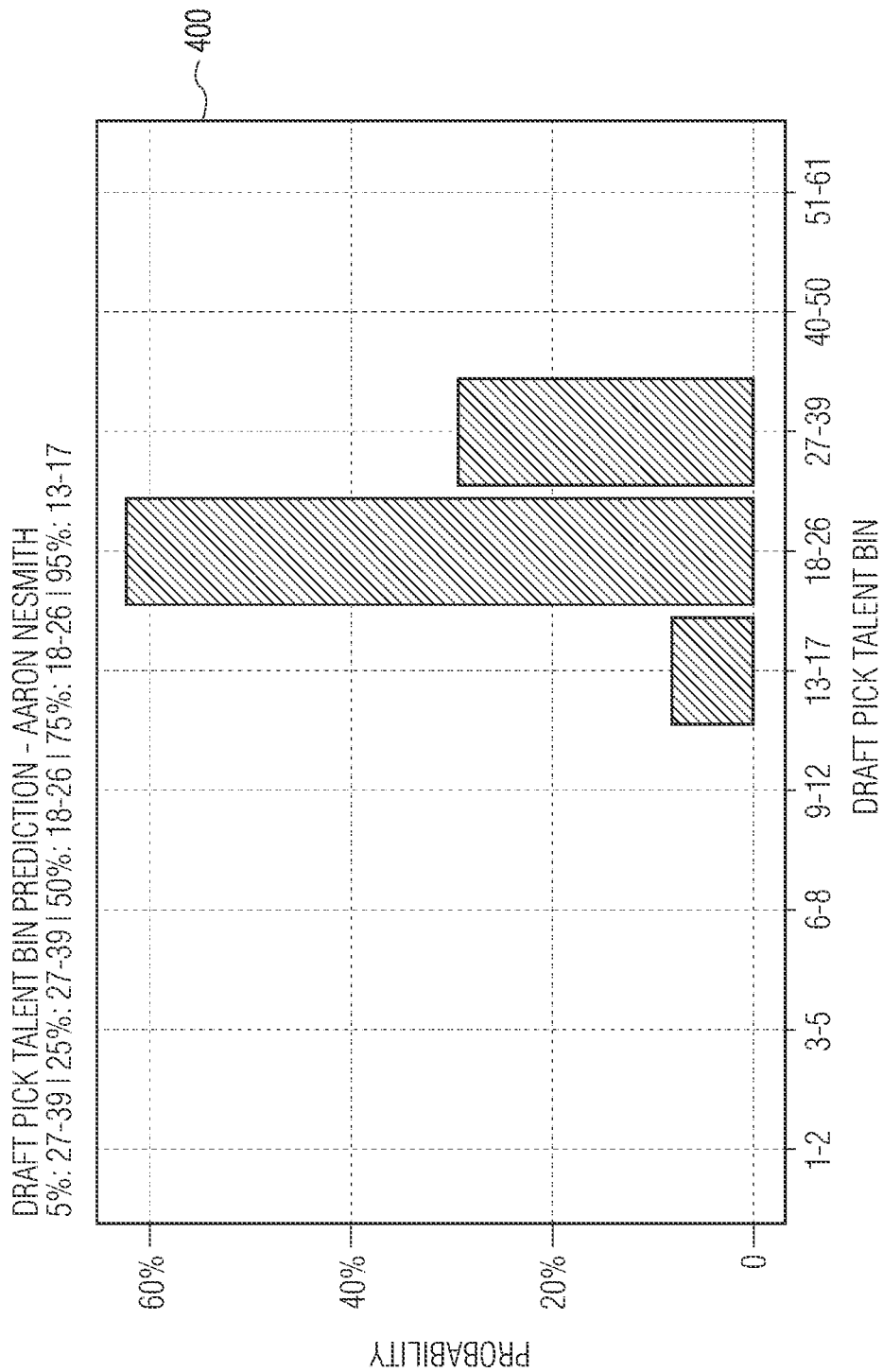

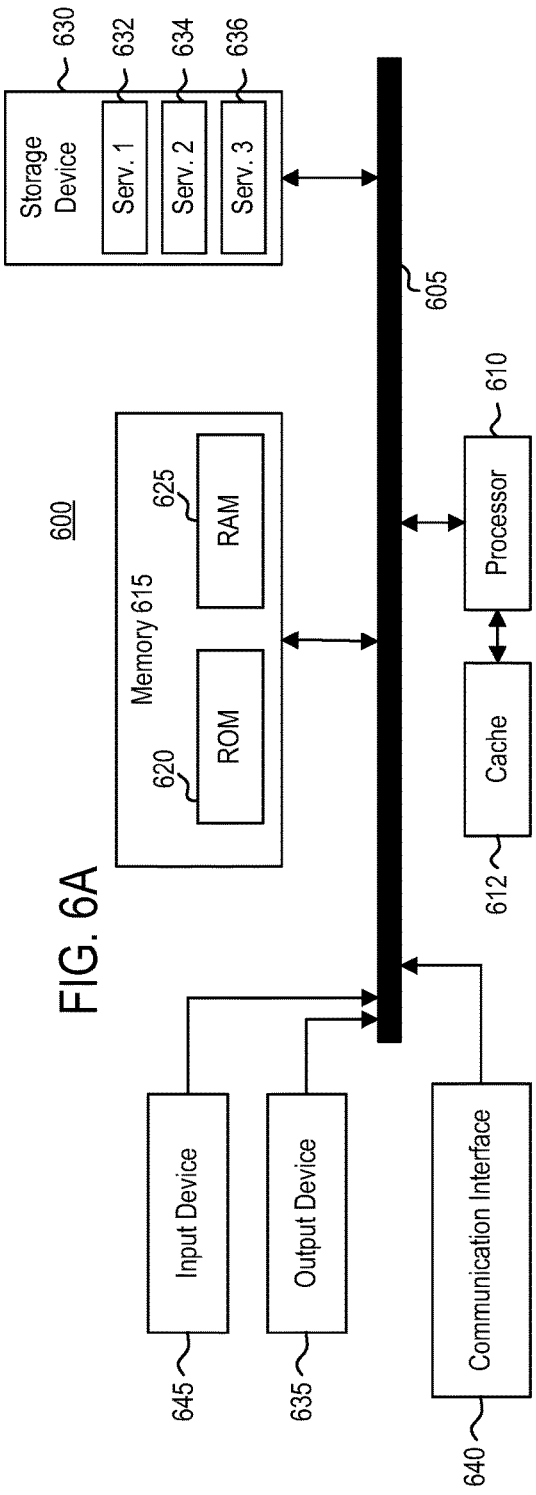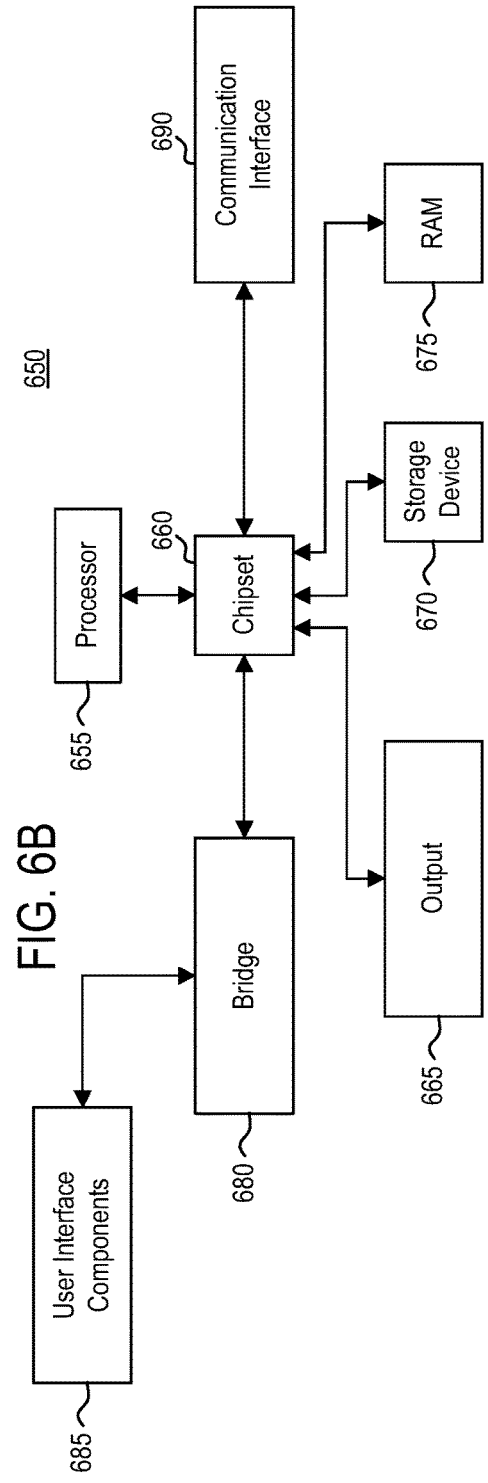

PREDICTION OF NBA TALENT AND QUALITY FROM NON-PROFESSIONAL TRACKING DATA

CROSS-REFERENCE TO RELATED APPLICATIONS

This application claims priority to U.S. Provisional Application Ser. No. 63/086,372, filed Oct. 1, 2020, which is hereby incorporated by reference in its entirety.

FIELD OF DISCLOSURE

This application generally relates to a system and method for predicting NBA talent from non-professional tracking data.

BACKGROUND

Professional sports commentators and fans alike typically engage in what-if scenarios for players. For example, a common thread in sports media focuses on how a college player or international player may translate to a professional league (e.g., the NBA).

SUMMARY

In some embodiments, a method is disclosed herein. A computing system identifies broadcast video for a plurality of games in a first league. The broadcast video includes a plurality of video frames. The computing system generates tracking data for each game from the broadcast video of a corresponding game. The computing system enriches the tracking data. The enriching includes merging play-by-play data for the game with the tracking data of the corresponding game. The computing system generates padded tracking data based on the tracking data. The computing system projects player performance in a second league for each player based on the tracking data and the padded tracking data.

In some embodiments, a non-transitory computer readable medium is disclosed herein. The non-transitory computer readable medium includes one or more sequence of instructions, which, when executed by a processor, causes a computing system to perform operations. The operations include identifying, by a computing system, broadcast video for a plurality of games. The broadcast video includes a plurality of video frames. The operations further include generating, by the computing system, tracking data for each game from the broadcast video of a corresponding game. The operations further include enriching, by the computing system, the tracking data. The enriching includes merging play-by-play data for the game with the tracking data of the corresponding game. The operations further include generating, by the computing system, padded tracking data based on the tracking data. The operations further include identifying, by the computing system, a subset of players that have at least a threshold percentage chance of being drafted based on the tracking data and the padded tracking data. The operations further include projecting, by the computing system, a range of draft positions for each player of the subset of players based on the tracking data and the padded tracking data.

In some embodiments, a system is disclosed herein. The system includes a processor and a memory. The memory has programming instructions stored thereon, which, when executed by the processor, causes the system to perform operations. The operations include identifying broadcast video for a plurality of games. The broadcast video includes a plurality of video frames. The operations further include generating tracking data for each game from the broadcast video of a corresponding game. The operations further include enriching the tracking data. The enriching includes merging play-by-play data for the game with the tracking data of the corresponding game. The operations further include generating padded tracking data based on the tracking data. The operations further include identifying a subset of players that have at least a threshold percentage chance of being drafted based on the tracking data and the padded tracking data. The operations further include projecting a range of draft positions for each player of the subset of players based on the tracking data and the padded tracking data.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrated only typical embodiments of this disclosure and are therefore not to be considered limiting of its scope, for the disclosure may admit to other equally effective embodiments.

FIG. 4 illustrates an exemplary chart corresponding to a draft talent bin prediction for Player B, according to example embodiments.

FIG. 6A is a block diagram illustrating a computing device, according to example embodiments.

FIG. 6B is a block diagram illustrating a computing device, according to example embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

Figure 1:
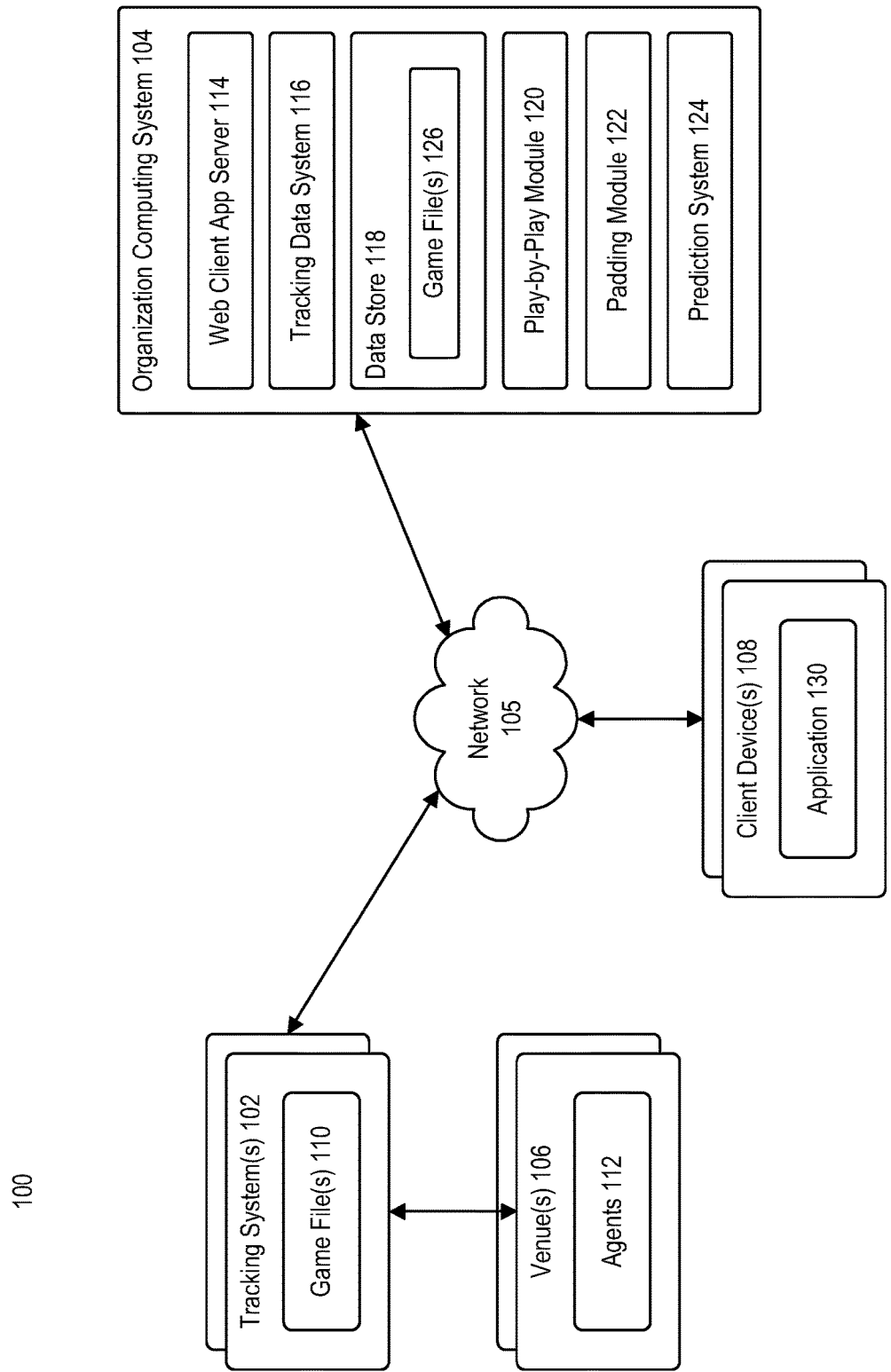
FIG. 1 is a block diagram illustrating a computing environment, according to example embodiments.

The field of sports analytics has grown exponentially over the years as access to finer grained player data in the world of professional sports in the United States has become easier. However, while professional sports leagues have the revenue to install state of the art optical player and ball tracking systems in select arenas and/or stadiums, such wide-spread adoption is not present in non-professional sports leagues. For example, for basketball, select NBA arenas may have an optical player and ball tracking system deployed therein; however, colleges and universities in the NCAA, teams in the NBA development league (i.e., the G-league), and international leagues (e.g., Liga ACB in Spain, Chinese Basketball Association, Basketball Champions League, and the like) may not have the revenue or ability to deploy optical player and ball tracking systems in the arenas those teams occupy. For example, in-venue hardware solutions are simply impractical for the NCAA, with over 300 Division I schools alone in addition to the numerous exhibition, tournament, and post-season games not played at NCAA venues. Such limitation impacts the NBA, for example, in that NBA teams are thus severely limited in their decision making ability for an upcoming track due to the lack of detailed tracking data of draft-eligible players from these leagues. Additionally, this limitation is compounded by the fact that in-venue optical player and ball tracking systems are a newer phenomenon. As such, it is difficult for an NBA front office to accurately model a college player's future potential output, as there is a lack of historical tracking data for current or past NBA players to build a training set for modeling.

To account for this limitation, one or more techniques described herein utilize state-of-the-art computer vision techniques to capture player and ball tracking data from thousands of historical non-NBA games (e.g., NCAA D-I Men's basketball games) directly from broadcast video. The volume of such data may equate to more than 650,000 possessions and over 300 million frames of broadcast video. From the tracking data, the one or more techniques described herein automatically detect events, such as, but not limited to, ball-screens, drives, isolations, post-ups, off-ball screens, defensive match-ups, etc., using an actor-action attention neural network system.

While the one or more techniques for generating tracking data from broadcast video data for non-professional sports (e.g., college basketball) is in itself a massive breakthrough in the field of sports analytics, the tracking data alone is not enough for the present task. To showcase the value of the generated tracking data, the present technique implements a trained prediction model configured to predict the talent of future NBA players based, in part, on the generated tracking data. For example, the prediction model described herein is configured to predict the probability of a player making the NBA directly from the non-professional data. Through the use of the generated tracking data, the present techniques are able to obtain or generate more accurate forecasts of draft-eligible player performance in the NBA compared to traditional or conventional data source.

Additionally, while projecting or predicting the talent of future NBA players is a substantial contribution to the technical field of sports analytics in and of itself, the present approach may not be limited to a single output. Instead, one or more techniques described herein utilizes interpretable machine learning techniques, such as Shapley values, to not only create accurate predictions, but also identify the strengths and weaknesses of a specific player.

While the present techniques described herein are described in conjunction with the NBA and projecting college athlete performance in the NBA, those skilled in the art understand that such techniques can be applied beyond college athlete performance and to international player performance. Additionally, the present solution is not intended to be limited to projecting performance in the NBA. Instead, the one or more techniques described herein can be broadly applied to project player performance from League X to League Y in any sport.

FIG. 1 is a block diagram illustrating a computing environment 100, according to example embodiments. Computing environment 100 may include tracking system 102, organization computing system 104, and one or more client devices 108 communicating via network 105.

Network 105 may be of any suitable type, including individual connections via the Internet, such as cellular or Wi-Fi networks. In some embodiments, network 105 may connect terminals, services, and mobile devices using direct connections, such as radio frequency identification (RFID), near-field communication (NFC), Bluetooth™, low-energy Bluetooth™ (BLE), Wi-Fi™, ZigBee™, ambient backscatter communication (ABC) protocols, USB, WAN, or LAN. Because the information transmitted may be personal or confidential, security concerns may dictate one or more of these types of connection be encrypted or otherwise secured. In some embodiments, however, the information being transmitted may be less personal, and therefore, the network connections may be selected for convenience over security.

Network 105 may include any type of computer networking arrangement used to exchange data or information. For example, network 105 may be the Internet, a private data network, virtual private network using a public network and/or other suitable connection(s) that enables components in computing environment 100 to send and receive information between the components of environment 100.

Tracking system 102 may be positioned in a venue 106. For example, venue 106 may be configured to host a sporting event that includes one or more agents 112. Tracking system 102 may be configured to capture the motions of all agents (i.e., players) on the playing surface, as well as one or more other objects of relevance (e.g., ball, referees, etc.). In some embodiments, tracking system 102 may be an optically-based system using, for example, a plurality of fixed cameras. For example, a system of six stationary, calibrated cameras, which project the three-dimensional locations of players and the ball onto a two-dimensional overhead view of the court may be used. In another example, a mix of stationary and non-stationary cameras may be used to capture motions of all agents on the playing surface as well as one or more objects or relevance. As those skilled in the art recognize, utilization of such tracking system (e.g., tracking system 102) may result in many different camera views of the court (e.g., high sideline view, free-throw line view, huddle view, face-off view, end zone view, etc.).

In some embodiments, tracking system 102 may be used for a broadcast feed of a given match. In such embodiments, each frame of the broadcast feed may be stored in a game file 110.

In some embodiments, game file 110 may further be augmented with other event information corresponding to event data, such as, but not limited to, game event information (pass, made shot, turnover, etc.) and context information (current score, time remaining, etc.).

Tracking system 102 may be configured to communicate with organization computing system 104 via network 105. For example, tracking system 102 may be configured to provide organization computing system 104 with a broadcast stream of a game or event in real-time or near real-time via network 105.

Organization computing system 104 may be configured to process the broadcast stream of the game. Organization computing system 104 may include at least a web client application server 114, tracking data system 116, data store 118, play-by-play module 120, padding module 122, and prediction system 124. Each of tracking data system 116, play-by-play module 120, padding module 122, and prediction system 124 may be comprised of one or more software modules. The one or more software modules may be collections of code or instructions stored on a media (e.g., memory of organization computing system 104) that represent a series of machine instructions (e.g., program code) that implements one or more algorithmic steps. Such machine instructions may be the actual computer code the processor of organization computing system 104 interprets to implement the instructions or, alternatively, may be a higher level of coding of the instructions that is interpreted to obtain the actual computer code. The one or more software modules may also include one or more hardware components. One or more aspects of an example algorithm may be performed by the hardware components (e.g., circuitry) itself, rather than as a result of the instructions.

Tracking data system 116 may be configured to receive broadcast data from tracking system 102 and generate tracking data from the broadcast data. In some embodiments, tracking data system 116 may largely be representative of AutoSTATS®, an artificial intelligence and computer vision system configured to derive player-tracking data from broadcast video feeds, commercially available from STATS Perform, headquartered in Chicago, Ill.

To generate the tracking data from the broadcast data, tracking data system 116 may map pixels corresponding to each player and ball to dots and may transform the dots to a semantically meaningful event layer, which may be used to describe player attributes. For example, tracking data system 116 may be configured to ingest broadcast video received from tracking system 102. In some embodiments, tracking data system 116 may further categorize each frame of the broadcast video into trackable and non-trackable clips. In some embodiments, tracking data system 116 may further calibrate the moving camera based on the trackable and non-trackable clips. In some embodiments, tracking data system 116 may further detect players within each frame using skeleton tracking. In some embodiments, tracking data system 116 may further track and re-identify players over time. For example, tracking data system 116 may reidentify players who are not within a line of sight of a camera during a given frame. In some embodiments, tracking data system 116 may further detect and track the ball across all frames. In some embodiments, tracking data system 116 may further utilize optical character recognition techniques. For example, tracking data system 116 may utilize optical character recognition techniques to extract score information and time remaining information from a digital scoreboard of each frame.

Such techniques assist in tracking data system 116 generating tracking data from the broadcast. For example, tracking data system 116 may perform such processes to generate tracking data across 650,000 college basketball possessions, totaling about 300 million broadcast frames. In addition to such process, organization computing system 104 may go beyond the generation of tracking data from broadcast video data. Instead, to provide descriptive analytics, as well as a useful feature representation for prediction system 124, organization computing system 104 may be configured to map the tracking data to a semantic layer (i.e., events).

Play-by-play module 120 may be configured to receive play-by-play data from one or more third party systems. For example, play-by-play module 120 may receive a play-by-play feed corresponding to the broadcast video data. In some embodiments, the play-by-play data may be representative of human generated data based on events occurring within the game. Even though the goal of computer vision technology is to capture all data directly from the broadcast video stream, the referee, in some situations, is the ultimate decision maker in the successful outcome of an event. For example, in basketball, whether a basket is a 2-point shot or a 3-point shot (or is valid, a travel, defensive/offensive foul, etc.) is determined by the referee. As such, to capture these data points, play-by-play module 120 may utilize manually annotated data that may reflect the referee's ultimate adjudication. Such data may be referred to as the play-by-play feed.

To help identify events within the generated tracking data, tracking data system 116 may merge or align the play-by-play data with the raw generated tracking data (which may include the game and shot clock). Tracking data system 116 may utilize a fuzzy matching algorithm, which may combine play-by-play data, optical character recognition data (e.g., shot clock, score, time remaining, etc.), and play/ball positions (e.g., raw tracking data) to generate the aligned tracking data.

Once aligned, tracking data system 116 may be configured to perform various operations on the aligned tracking system. For example, tracking data system 116 may use the play-by-play data to refine the player and ball positions and precise frame of the end of possession events (e.g., shot/rebound location). In some embodiments, tracking data system 116 may further be configured to detect events, automatically, from the tracking data. In some embodiments, tracking data system 116 may further be configured to enhance the events with contextual information.

For automatic event detection, tracking data system 116 may include a neural network system trained to detect/refine various events in a sequential manner. For example, tracking data system 116 may include an actor-action attention neural network system to detect/refine one or more of: shots, rebounds, passes, dribbles and possessions. Tracking data system 116 may further include a host of specialist event detectors trained to identify higher-level events. Exemplary higher-level events may include, but are not limited to, postups, drives, isolations, ball-screens, handoffs, off-ball-screens, the like. In some embodiments, each of the specialist event detectors may be representative of a neural network, specially trained to identify a specific event type. More generally, such event detectors may utilize any type of detection approach. For example, the specialist event detectors may use a neural network approach or another machine learning classifier (e.g., random decision forest, SVM, logistic regression etc.).

While mapping the tracking data to events enables a player representation to be captured, to further build out the best possible player representation, tracking data system 116 may generate contextual information to enhance the detected events. Exemplary contextual information may include defensive matchup information (e.g., who is guarding who at each frame), as well as other defensive information such as coverages for ball-screens.

In some embodiments, to measure defense, tracking data system 116 may use a measure referred to as an "influence score." The influences score may capture the influence a defender may have on each offensive player on a scale of 0-100. In some embodiments, the value for the influence score may be based on basketball defensive principles, such as, but not limited to, proximity to player, distance from basket, passing lanes, lanes to the basket, and the like.

In some embodiments, in addition to assigning frame-level defensive matchups using the influences score, tracking data system 116 may further use the influence score to assign defender roles for the ball-handler and screener for on-ball screens. In some embodiments, tracking data system 116 may further use the influence score to assign defender roles for the cutter and screener for off-ball screens.

Padding module 122 may be configured to create new player representations using mean-regression to reduce random noise in the features. For example, one of the profound challenges of modeling using potentially only 20-30 games of NCAA data per player may be the high variance of low frequency events seen in the tracking data. A highly talented one and done player may, for example, only attempt 50 isolation shots in a career. Such limited amount of data may not be enough to generate a robust mean value for the player's isolation shooting percentage. Therefore, padding module 122 may be configured to utilize a padding method, which may be a weighted average between the observed values and sample mean. Padding module 122 may solve for the optimal weighting constant, C, which may best predict the next game of a player's career. Because this approach can be applied to any game level statistic, padding module 122 may be configured to apply such technique to every feature in both box-score and AutoSTATS data. In some embodiments, certain player level statistics, such as height, weight, minutes/possessions played, etc. may be excluded.

Accordingly, for each player, tracking data system 116, play-by-play module 120, and padding module 122 may work in conjunction to generate a raw data set and a padded data set for each player.

Figure 2:
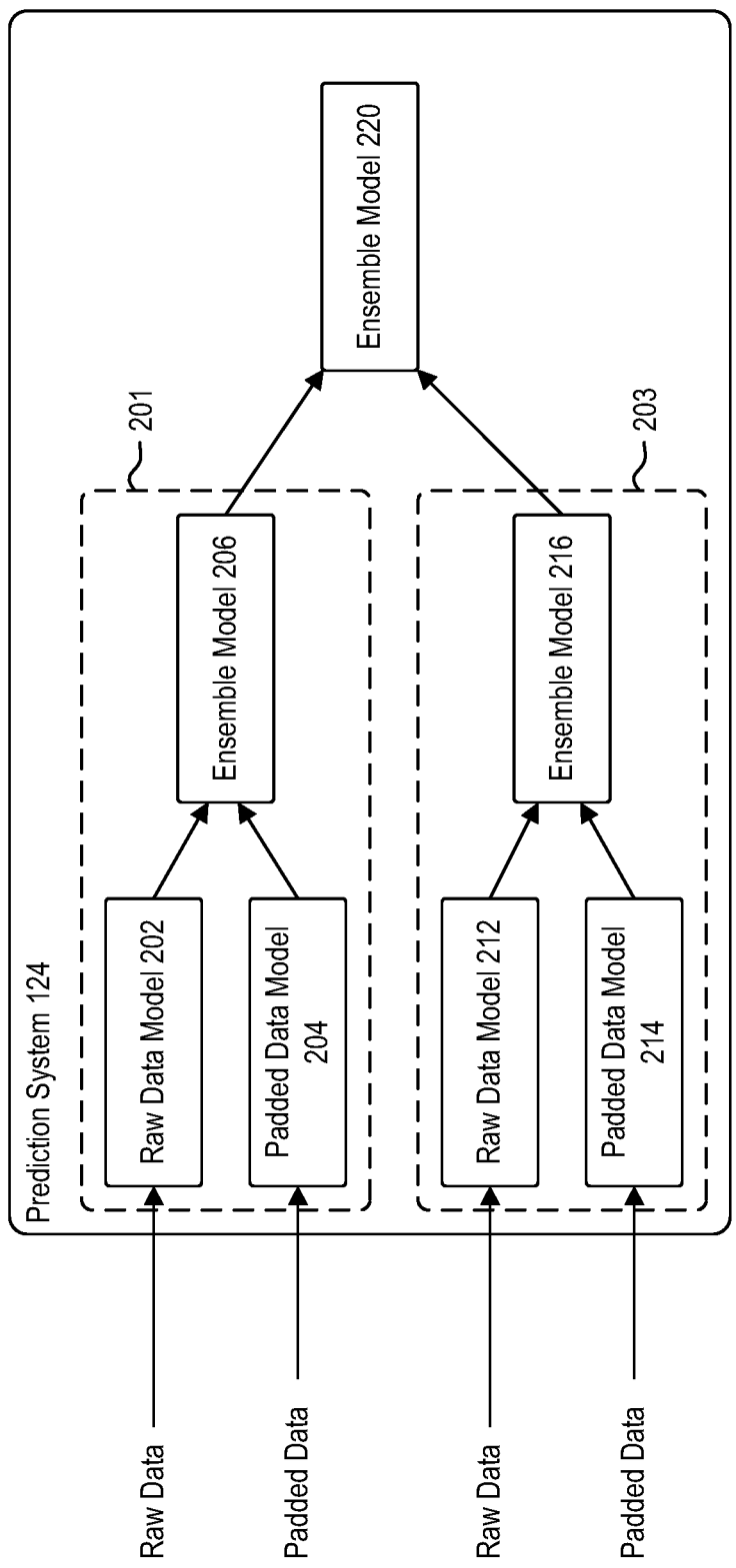
FIG. 2 is a block diagram illustrating prediction system of the computing system of FIG. 1, according to example embodiments.

Prediction system 124 may be configured or trained to generate or identify the likelihood of a draft-eligible player to be drafted. Prediction system 124 is discussed further in conjunction with FIG. 2 provided below.

Data store 118 may be configured to store one or more game files 126. Each game file 126 may include video data of a given match. For example, the video data may correspond to a plurality of video frames captured by tracking system 102, the tracking data derived from the broadcast video as generated by tracking data system 116, play-by-play data, enriched data, and/or padded training data.

Client device 108 may be in communication with organization computing system 104 via network 105. Client device 108 may be operated by a user. For example, client device 108 may be a mobile device, a tablet, a desktop computer, or any computing system having the capabilities described herein. Users may include, but are not limited to, individuals such as, for example, subscribers, clients, prospective clients, or customers of an entity associated with organization computing system 104, such as individuals who have obtained, will obtain, or may obtain a product, service, or consultation from an entity associated with organization computing system 104.

Client device 108 may include at least application 130. Application 130 may be representative of a web browser that allows access to a website or a stand-alone application. Client device 108 may access application 130 to access one or more functionalities of organization computing system 104. Client device 108 may communicate over network 105 to request a webpage, for example, from web client application server 114 of organization computing system 104. For example, client device 108 may be configured to execute application 130 to view NBA draft projections of draft eligible players. The content that is displayed to client device 108 may be transmitted from web client application server 114 to client device 108, and subsequently processed by application 130 for display through a graphical user interface (GUI) of client device 108.

FIG. 2 is a block diagram illustrating prediction system 124, according to example embodiments. As shown, prediction system 124 may include several models. For example, prediction system 124 may include a first set of models 201 and a second set of models 203. First set of models 201 may be configured to generate a prediction related to whether a player will make the NBA. Second set of models 204 may be configured to generate a prediction related to the player's projected draft pick. An ensemble model 220 may be used to classify the player into one of several bins, with each bin representing a range of draft picks.

As shown, first set of models 204 may include a raw data model 202, a padded data model 204, and an ensemble model 206. Each of raw data model 202, padded data model 204, and ensemble model 206 may be referred to as classification models. For example, instead of using only the padded data, prediction system 124 may include two models—raw data model 202 using the raw data and padded data model 204 using padded data—and then ensembling the results using ensemble model 206. In some embodiments, for each of the raw data set and the padded data set, each data set may be prepared similarly for processing. For example, with the high dimensionality and relative similarity between many of the features, pairs of features that may be high collinear may be halved, starting with the most highly correlated. Whichever of each pair was more correlated with remaining features may be removed until no two features had an $R^2$ above a certain threshold (e.g., =>0.95).

In some embodiments, raw data model 202 for the raw data may be representative of a LightGBM classifier. In some embodiments, padded data model 204 for the padded data may be representative of a LightGBM classifier. In some embodiments, the hyperparameters for each of raw data model 202 and padded data model 204 may be tuned using five-fold cross validation on a random search across a parameter grid. By using a classifier, each model's predictions may be representative of a probability of the player making the NBA.

In some embodiments, the ensembling of both outputs from raw data model 202 and padded data model 204 may work to include predictive information contained separately in both data sets. The features space for the ensemble, a random forest classifier, may be the raw prediction, the padded prediction, and chances per game, an AutoSTATS derived feature that may be analogous to possessions per game.

In some embodiments, in order to properly understand why raw data model 202 and padded data model 204 made their predictions, prediction system 124 may utilize Shapley values, which is a game theory approach to interpret results of machine learning models. The Shapley values may provide, on a per-prediction basis, the direction and magnitude of each feature's contribution to the overall prediction. By combining the Shapley values for each of raw data model 202 and padded data model 204, the result may be used to understand the interplay between the raw data and the padded data, and the differing information they may provide.

While the outputs generated by each of raw data model 202 and padded data model 204 may be useful for understanding how the models function, the outputs may be used to trim the overall dataset of players to those plausible NBA players and begin the actual draft modeling. For example, raw data model 202 and padded data model 204 may be used to identify those players with greater than an x % (e.g., 40%) chance to make the NBA.

Second set of models 203 may be used in conjunction with first set of models 201 for projecting a range of draft picks in which a player may fall. As shown, the overall architecture of prediction system 124 may include first set of models 201 (described above), raw data model 212, padded data model 214, and ensemble model 216. As shown, the new components for the talent bin ensemble model may reuse the framework, where both the decorrelated raw and decorrelated padded data may be used in separate models and then ensembled to create three sets of predictions that may be carried forward. In some embodiments, each of raw data model 212 and padded data model 214 may be random forest regressors using a VORP (value over replacement player) pick values at each draft pick target. The predictions from raw data model 212 and padded data model 214 may then ensembled, with additional information from the make NBA models using NGBoost (e.g., ensemble model 216) to create regression predictions with independently modeled means and variances. The outputs from all existing and new components may be ensembled using a random forest multiclass classifier (e.g., ensemble model 220). For example, output from ensemble model 220 may classify a player into one of several bins. Exemplary bins may include:

| Bin | Pick Ranges |
|---|---|
| 1 | 1-2 |
| 2 | 3-5 |
| 3 | 6-8 |
| 4 | 9-12 |
| 5 | 13-17 |
| 6 | 18-26 |
| 7 | 27-39 |
| 8 | 40-50 |
| 9 | 41-61 |

Figure 3:
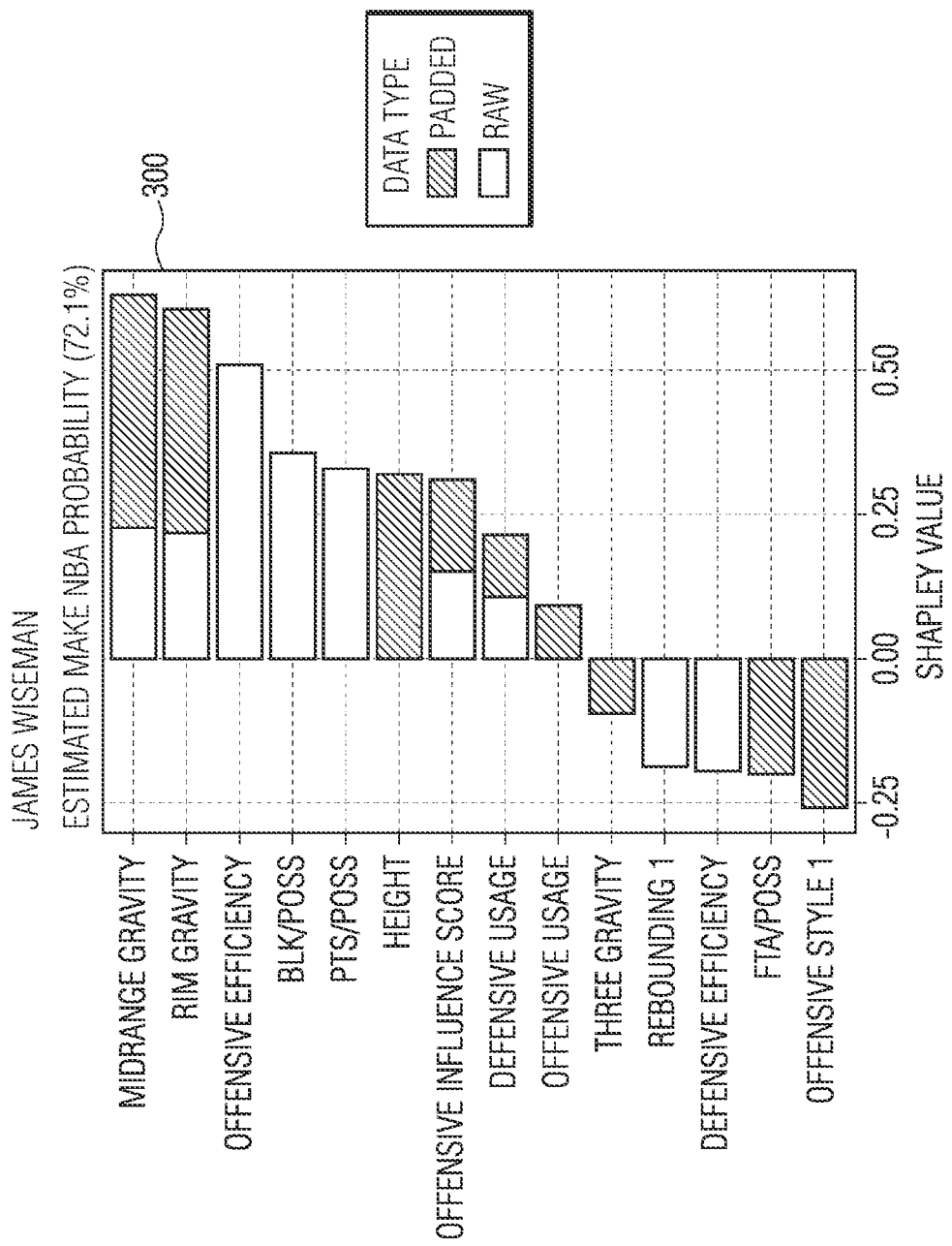
FIG. 3 illustrates an exemplary chart corresponding to the Shapley values generated for Player A using raw data and padded data, according to example embodiments.

FIG. 3 illustrates an exemplary chart 300 corresponding to the Shapley values generated for Player A using raw data and padded data, according to example embodiments.

As shown, Player A may correspond to James Wiseman, who was drafted #2 overall by the Golden State Warriors in the 2021 NBA Draft. Wiseman is a particularly interesting case because he only played a total of three games (69 minutes) in his college career. Looking at the raw data model, features such as points per possession (PTS/Poss) and blocks per possession (BLK/Poss) show very strongly as positive indicators of making the NBA. However, without their regressed versions (shown with dashed fill), which would show up as a stacked bar. Unsurprisingly, the padded data has regressed a three-game sample very heavily and reduced the quality of his raw scoring and block output. Non-regressed features, such as Rim Gravity and Midrange Gravity (both metrics of spatially weighted offensive efficiency and usage) show strongly positive in both the raw and padded data sets. Wiseman is a good example of not blindly adhering to model output. The model does not know why he only played three games, but when the padded and strongly regressed data are ensembled, the prediction is a lower probability of making the NBA compared to what would be expected based on known contextual information about his career.

It is important to note that the values are not outputs from the final ensemble, but are instead the outputs of the two primary sub-models of the ensemble, i.e., the raw data model and the padded data model.

FIG. 4 illustrates an exemplary chart 400 corresponding to a draft talent bin prediction for Player B, according to example embodiments.

As shown, Player B may correspond to Aaron Nesmith. Prediction system 124 may provide that Nesmith has approximately a 62% chance of having the statistical profile of a player picked in the 18-26 range historically. As this does not include any NBA or pre-draft rankings, the output from prediction system 124 is not predicting where a player will be taken, only what range of player to which they are similar.

While prediction system 124 does not actually attempt to answer the question of how good Player B will be, there is some semblance of a quality gradient under the assumption that early picks are usually better NBA players than later picks.

Figure 5A:
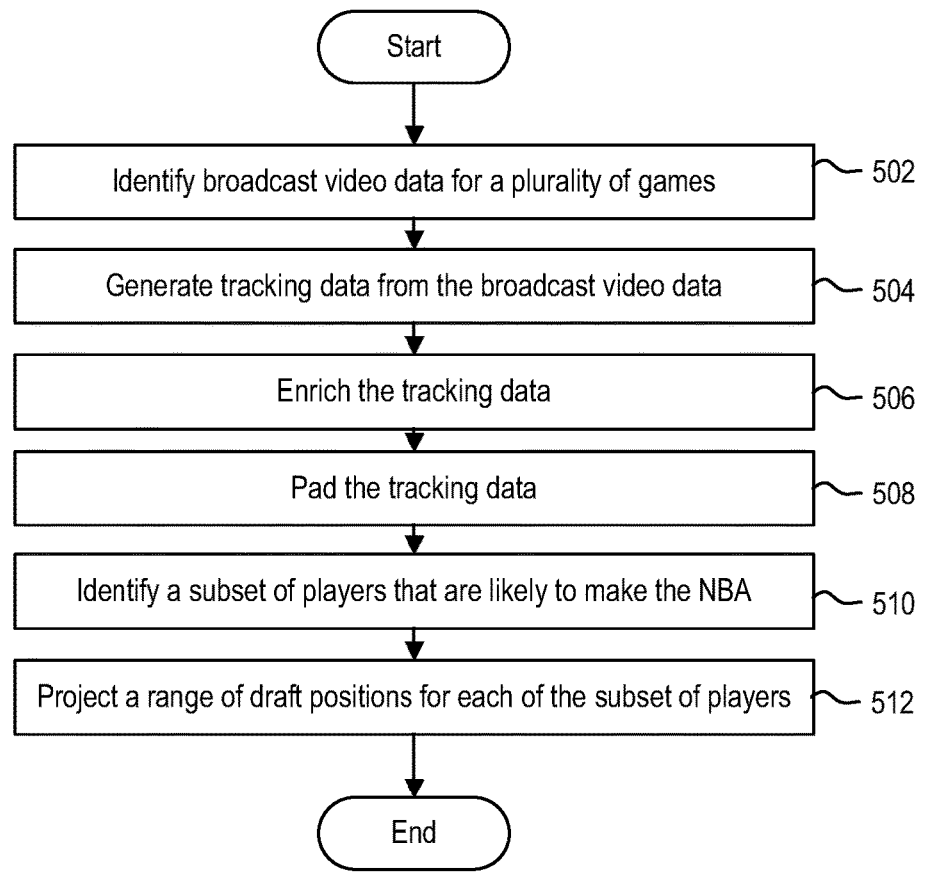
FIG. 5A is a flow diagram illustrating a method of predicting a range of draft positions for a draft eligible player, according to example embodiments.

FIG. 5A is a flow diagram illustrating a method 500 of predicting a range of draft positions for a draft eligible player, according to example embodiments. Method 500 may begin at step 502.

At step 502, organization computing system 104 may identify broadcast video data for a plurality of games. In some embodiments, the broadcast video data may be received from tracking system 102. In some embodiments, the broadcast video data for a game may be stored in data store 118. For example, the broadcast video data may be stored in a game file 126 corresponding to a game or event. Generally, the broadcast video data may include a plurality of video frames. In some embodiments, one or more video frames of the broadcast video data may include data, such as score board data included therein.

At step 504, organization computing system 104 may generate tracking data from the broadcast video data. For example, for each game, tracking data system 116 may use one or more computer vision and/or machine learning techniques to generate tracking data from the broadcast video data. To generate the tracking data from the broadcast data, tracking data system 116 may map pixels corresponding to each player and ball to dots and may transform the dots to a semantically meaningful event layer, which may be used to describe player attributes. For example, tracking data system 116 may be configured to ingest broadcast video received from tracking system 102. In some embodiments, tracking data system 116 may further categorize each frame of the broadcast video into trackable and non-trackable clips. In some embodiments, tracking data system 116 may further calibrate the moving camera based on the trackable and non-trackable clips. In some embodiments, tracking data system 116 may further detect players within each frame using skeleton tracking. In some embodiments, tracking data system 116 may further track and re-identify players over time. For example, tracking data system 116 may re-identify players who are not within a line of sight of a camera during a given frame. In some embodiments, tracking data system 116 may further detect and track the ball across all frames. In some embodiments, tracking data system 116 may further utilize optical character recognition techniques. For example, tracking data system 116 may utilize optical character recognition techniques to extract score information and time remaining information from a digital scoreboard of each frame.

At step 506, organization computing system 104 may enrich the tracking data. In some embodiments, enriching the tracking data may include tracking data system 116 merging play-by-play data for an event with the generated tracking data. For example, play-by-play module 120 may receive a play-by-play feed corresponding to the broadcast video data. In some embodiments, the play-by-play data may be representative of human generated data based on events occurring within the game. Tracking data system 116 may merge or align the play-by-play data with the raw generated tracking data (which may include the game and shot clock). In some embodiments, tracking data system 116 may utilize a fuzzy matching algorithm, which may combine play-by-play data, optical character recognition data (e.g., shot clock, score, time remaining, etc.), and play/ball positions (e.g., raw tracking data) to generate the aligned tracking data.

In some embodiments, enriching the tracking data may include tracking data system 116 performing various operations on the aligned tracking system. For example, tracking data system 116 may use the play-by-play data to refine the player and ball positions and precise frame of the end of possession events (e.g., shot/rebound location).

In some embodiments, enriching the tracking data may include tracking data system 116 detecting events, automatically, from the tracking data. For example, tracking data system 116 may include a neural network system trained to detect/refine various events in a sequential manner. For example, tracking data system 116 may include an actor-action attention neural network system to detect/refine one or more of: shots, rebounds, passes, dribbles and possessions. Tracking data system 116 may further include a host of specialist event detectors trained to identify higher-level events. Exemplary higher-level events may include, but are not limited to, postups, drives, isolations, ball-screens, hand-offs, off-ball-screens, the like. In some embodiments, each of the specialist event detectors may be representative of a neural network, specially trained to identify a specific event type.

In some embodiments, enriching the tracking data may include tracking data system 116 enhancing the detected events with contextual information. For example, tracking data system 116 may generate contextual information to enhance the detected events. Exemplary contextual information may include defensive matchup information (e.g., who is guarding who at each frame), as well as other defensive information such as coverages for ball-screens.

In some embodiments, enriching the tracking data may include tracking data system 116 generating an "influence score" for each matchup. The influences score may capture the influence a defender may have on each offensive player on a scale of 0-100. In some embodiments, the value for the influence score may be based on basketball defensive principles, such as, but not limited to, proximity to player, distance from basket, passing lanes, lanes to the basket, and the like.

In some embodiments, enriching the tracking data may include tracking data system 116 using the influence score to assign defender roles for the ball-handler and screener for on-ball screens. In some embodiments, tracking data system 116 may further use the influence score to assign defender roles for the cutter and screener for off-ball screens.

At step 508, organization computing system 104 may pad the tracking data. For example, padding module 122 may create new player representations using mean-regression to reduce random noise in the features. For example, one of the profound challenges of modeling using potentially only 20-30 games of NCAA data per player may be the high variance of low frequency events seen in the tracking data. A highly talented one and done player may, for example, only attempt 50 isolation shots in a career. Such limited amount of data may not be enough to generate a robust mean value for the player's isolation shooting percentage. Therefore, padding module 122 may be configured to utilize a padding method, which may be a weighted average between the observed values and sample mean. Padding module 122 may solve for the optimal weighting constant, C, which may best predict the next game of a player's career. Because this approach can be applied to any game level statistic, padding module 122 may be configured to apply such technique to every feature in both box-score and AutoSTATS data. In some embodiments, certain player level statistics, such as height, weight, minutes/possessions played, etc. may be excluded.

At step 510, organization computing system 104 may identify a subset of players that are likely to make the NBA. In some embodiments, prediction system 124 may identify the subset of players based on the raw tracking data and the padded tracking data. In some embodiments, each player of the subset of players may have better than a threshold percentage chance (e.g., 40%) of making the NBA.

At step 512, organization computing system 104 may project a range of draft positions for each player of the subset of players. For example, prediction system 124 may classify each player in the subset of players into one of several bins. Each bin may represent a range of draft positions. In this manner, prediction system 124 may identify the chances of each player having a statistical profile of a player picked in various ranges.

Figure 5B:
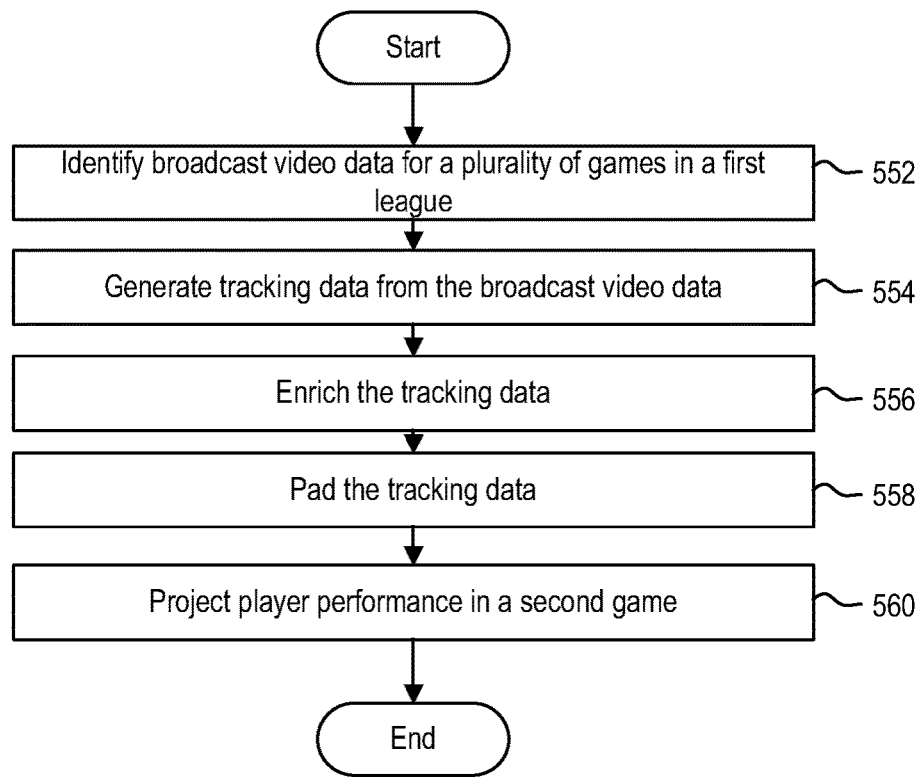
FIG. 5B is a flow diagram illustrating a method of predicting player performance in a second league for a player from a first league, according to example embodiments.

FIG. 5B is a flow diagram illustrating a method 550 of predicting player performance in a second league for a player from a first league, according to example embodiments. Method 550 may begin at step 552.

At step 552, organization computing system 104 may identify broadcast video data for a plurality of games in a first league. In some embodiments, the first league may be representative of a league or conference. For example, the first league may be NCAA men's basketball, Big 10 men's basketball, NBA Eastern Conference, NBA Atlantic Division, NBA G-league, international leagues, and the like. In some embodiments, the broadcast video data may be received from tracking system 102. In some embodiments, the broadcast video data for a game may be stored in data store 118. For example, the broadcast video data may be stored in a game file 126 corresponding to a game or event. Generally, the broadcast video data may include a plurality of video frames. In some embodiments, one or more video frames of the broadcast video data may include data, such as score board data included therein.

At step 554, organization computing system 104 may generate tracking data from the broadcast video data. For example, for each game, tracking data system 116 may use one or more computer vision and/or machine learning techniques to generate tracking data from the broadcast video data. To generate the tracking data from the broadcast data, tracking data system 116 may map pixels corresponding to each player and ball to dots and may transform the dots to a semantically meaningful event layer, which may be used to describe player attributes. For example, tracking data system 116 may be configured to ingest broadcast video received from tracking system 102. In some embodiments, tracking data system 116 may further categorize each frame of the broadcast video into trackable and non-trackable clips. In some embodiments, tracking data system 116 may further calibrate the moving camera based on the trackable and non-trackable clips. In some embodiments, tracking data system 116 may further detect players within each frame using skeleton tracking. In some embodiments, tracking data system 116 may further track and re-identify players over time. For example, tracking data system 116 may re-identify players who are not within a line of sight of a camera during a given frame. In some embodiments, tracking data system 116 may further detect and track the ball across all frames. In some embodiments, tracking data system 116 may further utilize optical character recognition techniques. For example, tracking data system 116 may utilize optical character recognition techniques to extract score information and time remaining information from a digital scoreboard of each frame.

At step 556, organization computing system 104 may enrich the tracking data. In some embodiments, enriching the tracking data may include tracking data system 116 merging play-by-play data for an event with the generated tracking data. For example, play-by-play module 120 may receive a play-by-play feed corresponding to the broadcast video data. In some embodiments, the play-by-play data may be representative of human generated data based on events occurring within the game. Tracking data system 116 may merge or align the play-by-play data with the raw generated tracking data (which may include the game and shot clock). In some embodiments, tracking data system 116 may utilize a fuzzy matching algorithm, which may combine play-by-play data, optical character recognition data (e.g., shot clock, score, time remaining, etc.), and play/ball positions (e.g., raw tracking data) to generate the aligned tracking data.

In some embodiments, enriching the tracking data may include tracking data system 116 performing various operations on the aligned tracking system. For example, tracking data system 116 may use the play-by-play data to refine the player and ball positions and precise frame of the end of possession events (e.g., shot/rebound location).

In some embodiments, enriching the tracking data may include tracking data system 116 detecting events, automatically, from the tracking data. For example, tracking data system 116 may include a neural network system trained to detect/refine various events in a sequential manner. For example, tracking data system 116 may include an actor-action attention neural network system to detect/refine one or more of: shots, rebounds, passes, dribbles and possessions. Tracking data system 116 may further include a host of specialist event detectors trained to identify higher-level events. Exemplary higher-level events may include, but are not limited to, postups, drives, isolations, ball-screens, hand-offs, off-ball-screens, the like. In some embodiments, each of the specialist event detectors may be representative of a neural network, specially trained to identify a specific event type.

In some embodiments, enriching the tracking data may include tracking data system 116 enhancing the detected events with contextual information. For example, tracking data system 116 may generate contextual information to enhance the detected events. Exemplary contextual information may include defensive matchup information (e.g., who is guarding who at each frame), as well as other defensive information such as coverages for ball-screens.

In some embodiments, enriching the tracking data may include tracking data system 116 generating an "influence score" for each matchup. The influences score may capture the influence a defender may have on each offensive player on a scale of 0-100. In some embodiments, the value for the influence score may be based on basketball defensive principles, such as, but not limited to, proximity to player, distance from basket, passing lanes, lanes to the basket, and the like.

In some embodiments, enriching the tracking data may include tracking data system 116 using the influence score to assign defender roles for the ball-handler and screener for on-ball screens. In some embodiments, tracking data system 116 may further use the influence score to assign defender roles for the cutter and screener for off-ball screens.

At step 558, organization computing system 104 may pad the tracking data. For example, padding module 122 may create new player representations using mean-regression to reduce random noise in the features. In some embodiments, padding module 122 may be configured to utilize a padding method, which may be a weighted average between the observed values and sample mean. Padding module 122 may solve for the optimal weighting constant, C, which may best predict the next game of a player's career. Because this approach can be applied to any game level statistic, padding module 122 may be configured to apply such technique to every feature in both box-score and AutoSTATS data. In some embodiments, certain player level statistics, such as height, weight, minutes/possessions played, etc. may be excluded.

At step 560, organization computing system 104 may generate player performance projections in a second league for each player. In some embodiments, the second league may be a target league for which a player may be traded, signed to, etc. Using a specific example, the first league could be NBA Eastern Conference and the second league could be NBA Western Conference. In another example, the first league could be G-league and the second league could be the Chinese Basketball Association. In some embodiments, prediction system 124 may project player performance in the second league by classifying each player into one of several bins. Each bin may represent a tier of player performance (e.g., bin 1=bench player; bin 2=rotation player; bin 3=starter; bin 4=superstar; and the like. In some embodiments, prediction system 124 may project player performance by projecting or estimating season averages for each player in the new league.

FIG. 6A illustrates an architecture of computing system 600, according to example embodiments. System 600 may be representative of at least a portion of organization computing system 104. One or more components of system 600 may be in electrical communication with each other using a bus 605. System 600 may include a processing unit (CPU or processor) 610 and a system bus 605 that couples various system components including the system memory 615, such as read only memory (ROM) 620 and random access memory (RAM) 625, to processor 610. System 600 may include a cache of high-speed memory connected directly with, in close proximity to, or integrated as part of processor 610. System 600 may copy data from memory 615 and/or storage device 630 to cache 612 for quick access by processor 610. In this way, cache 612 may provide a performance boost that avoids processor 610 delays while waiting for data. These and other modules may control or be configured to control processor 610 to perform various actions. Other system memory 615 may be available for use as well. Memory 615 may include multiple different types of memory with different performance characteristics. Processor 610 may include any general purpose processor and a hardware module or software module, such as service 1 632, service 2 634, and service 3 636 stored in storage device 630, configured to control processor 610 as well as a special-purpose processor where software instructions are incorporated into the actual processor design. Processor 610 may essentially be a completely self-contained computing system, containing multiple cores or processors, a bus, memory controller, cache, etc. A multi-core processor may be symmetric or asymmetric.

To enable user interaction with the computing system 600, an input device 645 may represent any number of input mechanisms, such as a microphone for speech, a touch-sensitive screen for gesture or graphical input, keyboard, mouse, motion input, speech and so forth. An output device 635 (e.g., display) may also be one or more of a number of output mechanisms known to those of skill in the art. In some instances, multimodal systems may enable a user to provide multiple types of input to communicate with computing system 600. Communications interface 640 may generally govern and manage the user input and system output. There is no restriction on operating on any particular hardware arrangement and therefore the basic features here may easily be substituted for improved hardware or firmware arrangements as they are developed.

Storage device 630 may be a non-volatile memory and may be a hard disk or other types of computer readable media which may store data that are accessible by a computer, such as magnetic cassettes, flash memory cards, solid state memory devices, digital versatile disks, cartridges, random access memories (RAMs) 625, read only memory (ROM) 620, and hybrids thereof.

Storage device 630 may include services 632, 634, and 636 for controlling the processor 610. Other hardware or software modules are contemplated. Storage device 630 may be connected to system bus 605. In one aspect, a hardware module that performs a particular function may include the software component stored in a computer-readable medium in connection with the necessary hardware components, such as processor 610, bus 605, output device 635, and so forth, to carry out the function.

FIG. 6B illustrates a computer system 650 having a chipset architecture that may represent at least a portion of organization computing system 104. Computer system 650 may be an example of computer hardware, software, and firmware that may be used to implement the disclosed technology. System 650 may include a processor 655, representative of any number of physically and/or logically distinct resources capable of executing software, firmware, and hardware configured to perform identified computations. Processor 655 may communicate with a chipset 660 that may control input to and output from processor 655. In this example, chipset 660 outputs information to output 665, such as a display, and may read and write information to storage device 670, which may include magnetic media, and solid-state media, for example. Chipset 660 may also read data from and write data to RAM 675. A bridge 680 for interfacing with a variety of user interface components 685 may be provided for interfacing with chipset 660. Such user interface components 685 may include a keyboard, a microphone, touch detection and processing circuitry, a pointing device, such as a mouse, and so on. In general, inputs to system 650 may come from any of a variety of sources, machine generated and/or human generated.

Chipset 660 may also interface with one or more communication interfaces 690 that may have different physical interfaces. Such communication interfaces may include interfaces for wired and wireless local area networks, for broadband wireless networks, as well as personal area networks. Some applications of the methods for generating, displaying, and using the GUI disclosed herein may include receiving ordered datasets over the physical interface or be generated by the machine itself by processor 655 analyzing data stored in storage device 670 or RAM 675. Further, the machine may receive inputs from a user through user interface components 685 and execute appropriate functions, such as browsing functions by interpreting these inputs using processor 655.

It may be appreciated that example systems 600 and 650 may have more than one processor 610 or be part of a group or cluster of computing devices networked together to provide greater processing capability.

While the foregoing is directed to embodiments described herein, other and further embodiments may be devised without departing from the basic scope thereof. For example, aspects of the present disclosure may be implemented in hardware or software or a combination of hardware and software. One embodiment described herein may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory (ROM) devices within a computer, such as CD-ROM disks readably by a CD-ROM drive, flash memory, ROM chips, or any type of solid-state non-volatile memory) on which information is permanently stored; and (ii) writable storage media (e.g., floppy disks within a diskette drive or hard-disk drive or any type of solid state random-access memory) on which alterable information is stored. Such computer-readable storage media, when carrying computer-readable instructions that direct the functions of the disclosed embodiments, are embodiments of the present disclosure.

It will be appreciated to those skilled in the art that the preceding examples are exemplary and not limiting. It is intended that all permutations, enhancements, equivalents, and improvements thereto are apparent to those skilled in the art upon a reading of the specification and a study of the drawings are included within the true spirit and scope of the present disclosure. It is therefore intended that the following appended claims include all such modifications, permutations, and equivalents as fall within the true spirit and scope of these teachings.

The invention claimed is:

1. A method, comprising:
identifying, by a computing system, broadcast video for a plurality of games in a first league, wherein the broadcast video comprises a plurality of video frames;
generating, by the computing system, tracking data for each game from the broadcast video of a corresponding game;
enriching, by the computing system, the tracking data, the enriching comprising merging play-by-play data for the game with the tracking data of the corresponding game;
generating, by the computing system, padded tracking data based on the tracking data; and
projecting, by the computing system, player performance in a second league for each player based on the tracking data and the padded tracking data.

2. The method of claim 1, wherein enriching, by the computing system, the tracking data further comprises:
refining player and ball precisions in each frame of a respective broadcast video.

3. The method of claim 1, wherein enriching, by the computing system, the tracking data further comprises:
automatically detecting events, via a neural network, in each frame of a respective broadcast video.

4. The method of claim 3, further comprising:
enhancing the detected events with contextual information, the contextual information comprising defensive matchup information.

5. The method of claim 4, further comprising:
generating an influence score for each defensive matchup, wherein the influence score captures an influence of a defender on a respective defensive matchup.

6. The method of claim 1, wherein generating, by the computing system, the padded tracking data based on the tracking data comprises:
creating new player representations using mean-regression.

7. The method of claim 1, further comprising:
providing, by the computing system, the tracking data to a raw data model;
providing, by the computing system, the padded tracking data to a padded data model; and
ensembling, by the computing system, a first output from the raw data model and a second output from the padded data model.

8. The method of claim 7, wherein projecting, by the computing system, the player performance for each player based on the tracking data and the padded tracking data comprises:
providing the tracking data to a second raw data model;
providing the padded tracking data to a second padded data model; and
ensembling a third output from the second raw data model, a fourth output from the second padded data model, the first output, and the second output to classify the respective player into a bin.

9. A non-transitory computer readable medium comprising one or more sequence of instructions, which, when executed by a processor, causes a computing system to perform operations comprising:
identifying, by a computing system, broadcast video for a plurality of games, wherein the broadcast video comprises a plurality of video frames;
generating, by the computing system, tracking data for each game from the broadcast video of a corresponding game;
enriching, by the computing system, the tracking data, the enriching comprising merging play-by-play data for the game with the tracking data of the corresponding game;
generating, by the computing system, padded tracking data based on the tracking data;
identifying, by the computing system, a subset of players that have at least a threshold percentage chance of being drafted based on the tracking data and the padded tracking data; and
projecting, by the computing system, a range of draft positions for each player of the subset of players based on the tracking data and the padded tracking data.

10. The non-transitory computer readable medium of claim 9, wherein enriching, by the computing system, the tracking data further comprises:
refining player and ball precisions in each frame of a respective broadcast video.

11. The non-transitory computer readable medium of claim 9, wherein enriching, by the computing system, the tracking data further comprises:
automatically detecting events, via a neural network, in each frame of a respective broadcast video.

12. The non-transitory computer readable medium of claim 11, further comprising:
enhancing the detected events with contextual information, the contextual information comprising defensive matchup information.

13. The non-transitory computer readable medium of claim 12, further comprising:
generating an influence score for each defensive matchup, wherein the influence score captures an influence of a defender on a respective defensive matchup.

14. The non-transitory computer readable medium of claim 9, wherein generating, by the computing system, the padded tracking data based on the tracking data comprises:
creating new player representations using mean-regression.

15. The non-transitory computer readable medium of claim 9, wherein identifying, by the computing system, the subset of players that have at least the threshold percentage chance of being drafted based on the tracking data and the padded tracking data comprises:
providing the tracking data to a raw data model;
providing the padded tracking data to a padded data model; and
ensembling a first output from the raw data model and a second output from the padded data model to generate a percent likelihood of a respective player being drafted.

16. The non-transitory computer readable medium of claim 15, wherein projecting, by the computing system, the range of draft positions for each player of the subset of players based on the tracking data and the padded tracking data comprises:
providing the tracking data to a second raw data model;
providing the padded tracking data to a second padded data model; and
ensembling a third output from the second raw data model, a fourth output from the second padded data model, the percent likelihood of a respective player being drafted, the first output, and the second output to classify the respective player into a bin.

17. A system comprising:
a processor; and
a memory having programming instructions stored thereon, which, when executed by the processor, causes the system to perform operations comprising:
identifying broadcast video for a plurality of games, wherein the broadcast video comprises a plurality of video frames;
generating tracking data for each game from the broadcast video of a corresponding game;
enriching the tracking data, the enriching comprising merging play-by-play data for the game with the tracking data of the corresponding game;
generating padded tracking data based on the tracking data;
identifying a subset of players that have at least a threshold percentage chance of being drafted based on the tracking data and the padded tracking data; and
projecting a range of draft positions for each player of the subset of players based on the tracking data and the padded tracking data.

18. The system of claim 17, wherein identifying the subset of players that have at least the threshold percentage chance of being drafted based on the tracking data and the padded tracking data comprises:
providing the tracking data to a raw data model;
providing the padded tracking data to a padded data model; and
ensembling a first output from the raw data model and a second output from the padded data model to generate a percent likelihood of a respective player being drafted.

19. The system of claim 18, wherein projecting the range of draft positions for each player of the subset of players based on the tracking data and the padded tracking data comprises:

providing the tracking data to a second raw data model;

providing the padded tracking data to a second padded data model; and ensembling a third output from the second raw data model, a fourth output from the second padded data model, the percent likelihood of a respective player being drafted, the first output, and the second output to classify the respective player into a bin.

20. The system of claim 17, wherein enriching the tracking data further comprises:

refining player and ball precisions in each frame of a respective broadcast video.

\* \* \* \* \*